April 5, 1955 P. SOO HOO 2,705,435
TOY VIEWER FOR MOTION PICTURE FILMS
Filed March 20, 1953 2 Sheets-Sheet 1

INVENTOR.
PAUL SOO HOO,
BY
McMorrow, Berman & Davidson
ATTORNEYS.

April 5, 1955 P. SOO HOO 2,705,435
TOY VIEWER FOR MOTION PICTURE FILMS
Filed March 20, 1953 2 Sheets-Sheet 2

INVENTOR.
PAUL SOO HOO,
BY
McMorrow, Berman + Davidson
ATTORNEYS.

United States Patent Office 2,705,435
Patented Apr. 5, 1955

2,705,435

TOY VIEWER FOR MOTION PICTURE FILMS

Paul Soo Hoo, Boston, Mass.

Application March 20, 1953, Serial No. 343,695

4 Claims. (Cl. 88—16)

This invention relates to a device in the nature of a toy, which is adapted to be used for animating a motion picture film.

Summarized briefly, the invention includes a stationary base having a spring motor therein. A disc is supported upon the shaft of the motor, above the base, for rotation with said shaft, and carried by the periphery of the disc is a strip of motion picture film, having a plurality of picture frames alternating with viewing slots, said slots being registered with identical slots provided on the periphery of the disc. A stationary arm carried by the base has a sight opening through which one can look through the registered slots, toward the inner area of the disc. Carried by said arm is an extension arm having a reflecting mirror disposed inwardly of the disc, in the line of sight through the registered slots, the entire arrangement being one that will impart animation to the picture seen on the mirror, when the disc is rotated by the motor.

The invention has, among the important objects thereof, the following:

First, to provide a toy of the type stated which can be produced at relatively low cost, considering the attractive features thereof;

Second, to provide a toy as stated in which a high degree of animation is achieved, at relatively low cost;

Third, to provide a device for viewing motion picture films which will be so designed as to be usable not only as a toy, but also as an educational aid;

Fourth, to provide a viewer for motion picture films which will be so designed as to permit different films to be substituted easily and with considerable speed; and Fifth, to provide a toy as stated in which a reflecting means will be embodied in the disc, which reflecting means will illumine the motion picture film to a substantial degree, thus to improve considerably the quality of the animated picture.

Other objects will appear from the following description, the claims appended thereto, and from the annexed drawings, in which like reference characters designate like parts throughout the several views, and wherein:

Figure 1:
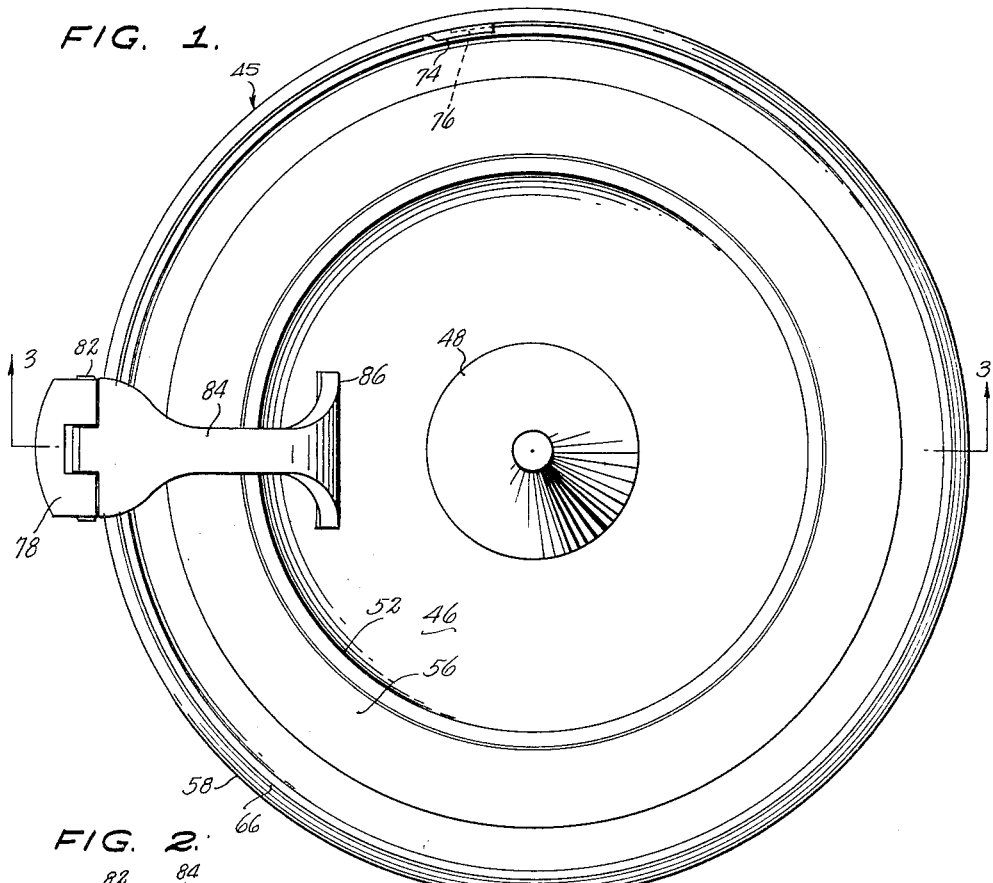
Figure 1 is a top plan view of a motion picture viewer formed in accordance with the present invention.
Figure 2:
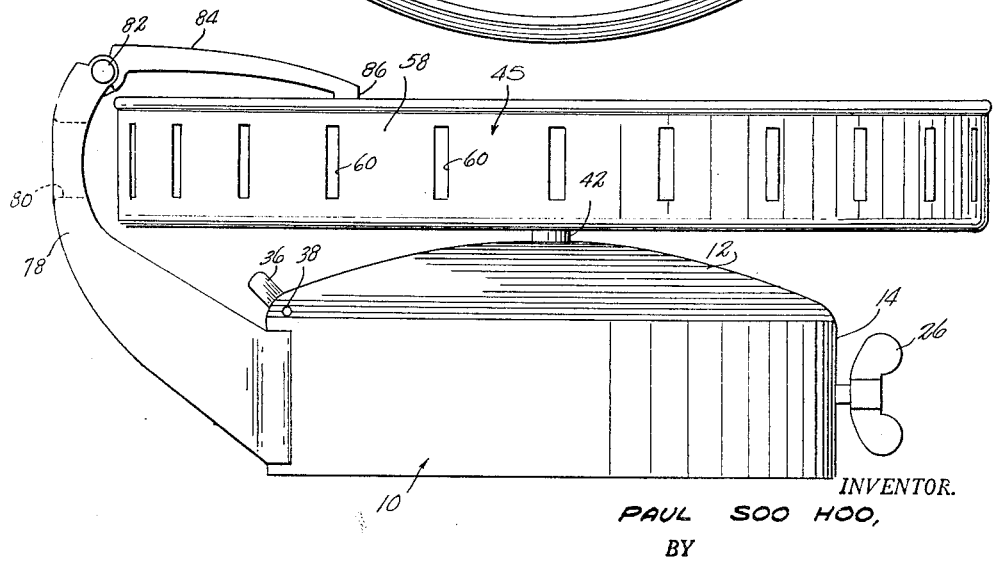
Figure 2 is a side elevational view.

The device constituting the present invention includes a stationary, hollow base designated geenrally by the reference numeral 10. The base 10 includes a concavo convex cover 12 integrally formed with a depending, peripheral skirt 14, said cover and skirt defining a housing for a spring motor.

Figure 3:
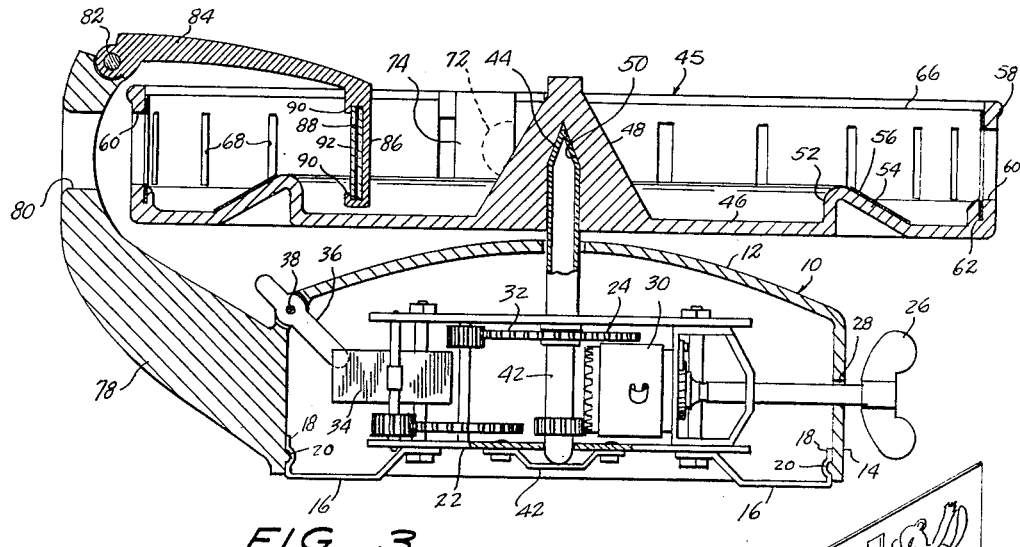
Figure 3 is a sectional view taken diametrically through the device, substantially on line 3—3 of Figure 1.

To support a motor within the base, I provide a pair of supporting strips 16 extending radially and inwardly of the base from diametrically opposite portions of the skirt 14, said strips 16 each having, at the outer ends thereof, upwardly extended ears 18. The ears 18 are recessed, as best shown in Figure 3, for interengagement with nodes 20 formed upon the skirt 14. Thus, the strips 16 can be sprung into place, and can be disengaged from the cover whenever necessary.

At their inner ends, the strips 16 are formed with upwardly offset terminal portions, said upwardly offset portions being secured to the circular lower guard 22 of a spring motor designated generally at 24. Since the spring motor is of conventional design, it will not be described in detail herein. It is sufficient to state that the spring motor includes a manually rotatable key 26 for winding the same, the shaft of said key extending through an opening 28 formed in the skirt 14. The key 26 is used for winding a main spring 30, which, when it unwinds, will rotate a train of gears 32. A governor 34 in the form of a flat blade is included in said train of gears. A brake lever 36 is pivoted as at 38 upon the cover 12, and when swung to the position shown in Figure 3, extends into the path of movement of the governor, thus to halt operation of the motor.

A lubrication disc 42 can be secured to the lower guard, and would be saturated with a suitable lubricant, said disc being engaged by the rounded inner end of the shaft 42 of the motor. Shaft 42 projects upwardly through a center opening formed in the cover 12, and a pointed tip 44 at its upper, projecting end.

The reference numeral 45 has been applied generally to designate a rotatable disc of substantial diameter, that is carried by and rotates with the shaft 42. The disc 45 includes a flat, circular, horizontally disposed body portion 46 integrally formed, at its center, with an upwardly extended, conical boss 48. The boss 48 is formed with a shaft-receiving socket 50 opening upwardly from the underside of the boss, said socket being conically formed at its inner end to frictionally grip the tip 44.

It will be appreciated that the arrangement is one which creates, in effect, a friction clutch between the shaft 42 and the disc 45, said clutch being the result of utilizing a pointed shaft 42 of metal material, that engages in the complementarily formed socket of a disc formed of a material softer than metal, such as plastic. The clutch arrangement will permit the disc to be rotated normally with the shaft 42, but is designed to leave the disc sufficiently loose upon the shaft to permit its manual rotation when a film strip is being changed.

Integrally formed upon the flat body portion 46, and spaced inwardly from the periphery of said body, is an upwardly extended, annular rib 52, said rib having a sloped surface 54 extended through its full circumference.

Secured adhesively or in any other suitable manner to the sloped surface 54 of the rib 52 is an endless, annular reflecting surface 56 of metal foil or the like. It will be understood that a suitable metal foil, such as aluminum, can be adhesively secured upon the sloped surface 54, and can be polished to a high sheen, so as to reflect the overhead lights of a room in which the device is being used radially and outwardly of the rotating dic.

The reflecting surface 56, as will be noted from Figure 3, constitutes the frustrum of a shallow cone aligned coaxially with the axis of rotation of the disc.

Integrally formed upon the periphery of the flat body portion 46 of the disc 45 is a low, upstanding, circumferential flange 58 formed throughout its circumference with equidistantly spaced, narrow, vertically disposed viewing slots 60.

At the base of the flange 58, I provide a continuous, relatively narrow groove 62, the outer wall of said groove being common to the inner wall of the flange 58. The groove 62 receives a removable film strip 66 formed throughout its length with a series of viewing slots 68 alternating with picture frames 70. The slots 68 are formed identically to the slots 60, and are registered with the slots 60 when the film strip is seated in the groove 62.

At one location upon the flange 58 there is provided an enlargement 74, said enlargement being formed upon the inner surface of the flange, and being slotted as at 76 to receive a tab 72 formed upon one end of the film strip. The tab 72 and its associated enlargement 74 cooperate to locate the film strip properly relative to the slots 60 of the flange 58.

Integrally or otherwise rigidly secured to the base 10 is an upwardly and outwardly extended arm 78 having, adjacent its outer end, a sight opening 80. The outer end portion of the arm 78, in which the opening is formed, extends substantially vertically in closely spaced relation to the flange 58, as best shown in Figure 3. Carried by the outer end of the arm 78 is a pivot pin 82, on which is swingably mounted an extension arm 84, that is adapted, when swung to its lower position shown in Figure 3, to extend radially and inwardly of the disc 45, over the flange 58. The free end of the extension arm 84 terminates inwardly of the reflecting surface 56 a short distance, short of the center of the disc. Formed upon said free end of the extension arm is a depending, flattened head 86 recessed as at 88, the top and bottom walls of the recess being formed with inturned flanges 90 adapted to grip the upper and lower edges of a mirror 92, seated in the recess.

Figure 4:
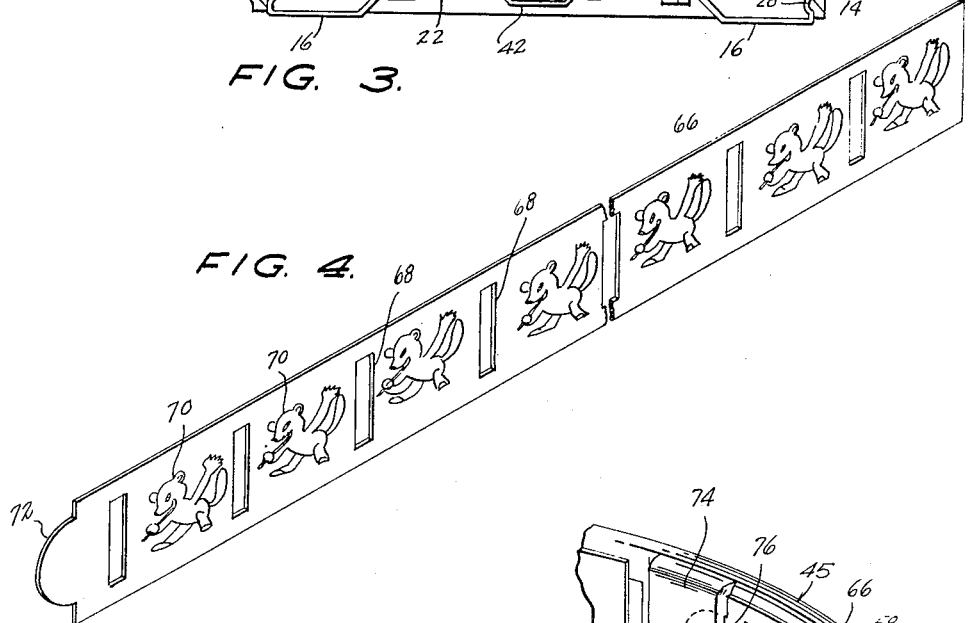
Figure 4 is a perspective view of one of the motion picture film strips, portions being broken away.
Figure 5:
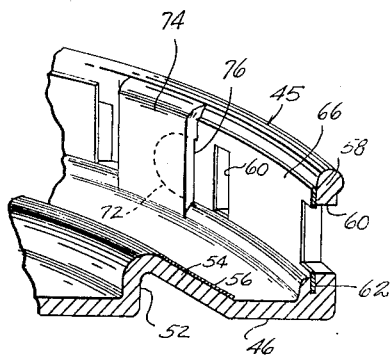
Figure 5 is a fragmentary perspective view of the rotatable disc and of a film strip carried thereby.

In use of the device, a film strip such as that shown in Figure 4 is selected, and is seated in the groove 62 in the manner previously described. The spring motor 24 is then wound, and brake 36 is released.

On release of the brake 36, the cylinder 45 will be rotated at a predetermined speed, said cylinder or disc carrying with it the motion picture film strip. One viewing the motion picture through the sight opening 80 will then, at closely spaced intervals, see on the mirror 92 a reflected image, said image being viewed through successively following, registered slots 60, 68. The arrangement produces an effect not unlike that obtained by the use of a shutter positioned momentarily over a projected motion picture during changing of the frames, and the net result is an animated picture seen on the mirror 92 that will be highly realistic, considering the relatively low cost of the viewing device.

The quality of the picture is enhanced, it should be noted, by the use of the reflecting foil 56, since said reflecting foil throws added light upon the motion picture, thereby to increase the clarity of the reflection seen in mirror 92.

It will be understood that whenever it is desired to change the film strip, it is merely necessary that the rotation of the disc 45 be halted, after which the extension arm 84 is swung upwardly from the position thereof shown in Figure 3. This provides access to the motion picture film strip, permitting the strip carried by the disc to be removed, for substitution of a new strip.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A device for viewing motion pictures comprising: a base; a disc rotatable thereon and including a peripheral flange formed with a circumferential series of slot-like openings; means for rotating the disc, said means comprising a motor mounted in the base and a shaft rotated by said motor and detachably engageable with the center portion of the disc; a film strip removably seated against the flange to extend peripherally of the disc and having a circumferential series of picture frames, said strip having a circumferential series of slot-like openings alternating with said frames and registered with the openings of the flange; a mirror surface disposed inwardly of the disc periphery for producing reflected images of said picture frames; an arm extending from the base exteriorly of and in closely spaced relation to said disc, said arm having a sight opening alignable with successively following registered openings of the strip and flange, for viewing said mirrored images, said mirror surface being adjustably mounted on said arm for movement to and away from the image-producing position thereof; and an annular light-reflecting surface on the disc disposed to cast reflected light against the strip during rotation of the disc.

2. A device for viewing motion pictures comprising: a base; a disc rotatable thereon and including a peripheral flange formed with a circumferential series of slot-like openings; a film strip removably seated against the flange to extend peripherally of the disc and having a circumferential series of picture frames, said strip having a circumferential series of slot-like openings alternating with said frames and registered with the openings of the flange; a mirror surface disposed inwardly of the disc periphery for producing reflected images of said picture frames; an arm extending from the base exteriorly of and in closely spaced relation to said disc, said arm having a sight opening alignable with successively following registered openings of the strip and flange for viewing said mirrored images, said mirror surface being adjustably mounted on said arm for movement to and away from the image-producing position thereof; and an annular light-reflecting surface on the disc disposed to cast reflected light against the strip during rotation of the disc.

3. A device for viewing motion pictures comprising: a base; a disc rotatable thereon and including a peripheral flange formed with a circumferential series of slot-like openings; a film strip removably seated against the flange to extend peripherally of the disc and having a circumferential series of picture frames, said strip having a circumferential series of slot-like openings alternating with said frames and registered with the openings of the flange; a mirror surface disposed inwardly of the disc periphery for producing reflected images of said picture frames; an arm extending from the base exteriorly of and in closely spaced relation to said disc, said arm having a sight opening alignable with successively following registered openings of the strip and flange for viewing said mirrored images, said mirror surface being adjustably mounted on said arm for movement to and away from the image-producing position thereof; and an annular light-reflecting surface on the disc disposed to cast reflected light against the strip during rotation of the disc, the adjustable mounting of the mirror surface comprising an extension pivotally connected at one end to the arm and extending over the flange radially and inwardly of the disc, the mirror surface being disposed at the opposite, free end of the extension and being faced toward the sight opening.

4. A device for viewing motion pictures comprising: a base; a disc rotatable thereon and including a peripheral flange formed with a circumferential series of slot-like openings; a film strip removably seated against the flange to extend peripherally of the disc and having a circumferential series of picture frames. Said strip having a circumferential series of slot-like openings alternating with said frames and registered with the openings of the flange; a mirror surface disposed inwardly of the disc periphery for producing reflected images of said picture frames; an arm extending from the base exteriorly of and in closely spaced relation to said disc, said arm having a sight opening alignable with successively following registered openings of the strip and flange for viewing said mirrored images, said mirror surface being adjustably mounted on said arm for movement to and away from the image-producing position thereof; and an annular light reflecting surface on the disc disposed to cast reflected light against the strip during rotation of the disc, the adjustable mounting of the mirror surface comprising an extension pivotally connected at one end to the arm and extending over the flange radially and inwardly of the disc, the mirror surface being disposed at the opposite, free end of the extension and being faced toward the sight opening, the light reflecting surface extending across the line of sight of a user viewing the mirror through the sight opening, and lying obliquely to the plane of rotation of the strip between the strip and mirror surface.

References Cited in the file of this patent

UNITED STATES PATENTS

| 972,344 | Davis | Oct. 11, 1910 |
| 1,014,365 | Bourgin | Jan. 9, 1912 |

FOREIGN PATENTS

| 4,244 | Great Britain | of 1877 |
| 372,033 | Great Britain | May 5, 1932 |
| 476,850 | Great Britain | Dec. 17, 1937 |